United States Patent [19]
Henkel

[11] Patent Number: 5,173,652
[45] Date of Patent: Dec. 22, 1992

[54] BATTERY CHARGERS FOR SECONDARY CELLS OF BATTERIES, WHICH CONTROL THE THERMO RESPONSE OF THE CHARGE ACCEPTOR

[76] Inventor: John R. Henkel, 1530 W. 2nd St., Davenport, Iowa 52802

[21] Appl. No.: 553,669

[22] Filed: Jul. 13, 1990

Related U.S. Application Data

[63] Continuation-in-part of Ser. No. 499,192, Mar. 23, 1990, abandoned, which is a continuation of Ser. No. 161,317, Feb. 23, 1988, abandoned, which is a continuation-in-part of Ser. No. 8,184, Jan. 28, 1987, abandoned, which is a continuation-in-part of Ser. No. 773,850, Sep. 9, 1985, Pat. No. 4,670,700, which is a continuation-in-part of Ser. No. 701,101, Feb. 13, 1985, abandoned.

[51] Int. Cl.⁵ ............................................. H02J 7/00
[52] U.S. Cl. ...................................... 320/2; 320/3; 320/6
[58] Field of Search .................. 320/2, 3, 4, 6, 15, 320/51, 57, 59

[56] References Cited

U.S. PATENT DOCUMENTS

| | | | |
|---|---|---|---|
| 1,445,025 | 2/1923 | McFarland | 320/6 |
| 3,005,943 | 10/1961 | Jaffe | 320/15 X |
| 3,029,301 | 4/1962 | Strider | 362/183 |
| 3,350,618 | 10/1967 | Barney et al. | 320/35 |
| 3,354,374 | 11/1967 | Barry | 320/39 X |
| 3,521,050 | 5/1968 | Shagena, Jr. | 307/112 |
| 3,749,905 | 7/1973 | Friedman et al. | 320/3 X |
| 3,825,740 | 7/1974 | Friedman et al. | 320/3 X |
| 4,311,952 | 1/1982 | Mabuchi et al. | 320/3 |
| 4,422,031 | 12/1983 | Vigerstol | 320/2 |

OTHER PUBLICATIONS

Braun et al., Nickel–Cadmium Battery Application Handbook, General Electric Company, 1986, pp. 3–8, 9, 37 and 38.

Primary Examiner—Steven L. Stephan
Assistant Examiner—Kristine Peckman
Attorney, Agent, or Firm—Laff, Whitesel, Conte & Saret

[57] ABSTRACT

A battery charging system has an effective pure DC power source charging at least one secondary charge acceptor utilizing an aqueous electrolyte. The applied effective voltage is equal to or slightly greater than the full charge level of said acceptor cell. An impedance/resistance is coupled between the power source and the secondary charge acceptor cell. The impedance/resistance is a value which reduces any AC component out of the secondary cell to no more than 5% of the total voltage out in order to reduce the counterelectromotive force responsive to the applied voltage. The impedance/resistance has a value which is selected to set the capacitive reactance of the acceptor cell and the inductance reactance of the power source at levels which reduce the counterelectromotive force of the acceptor cell throughout the full charge cycle in order to produce a cooling effect.

15 Claims, 1 Drawing Sheet

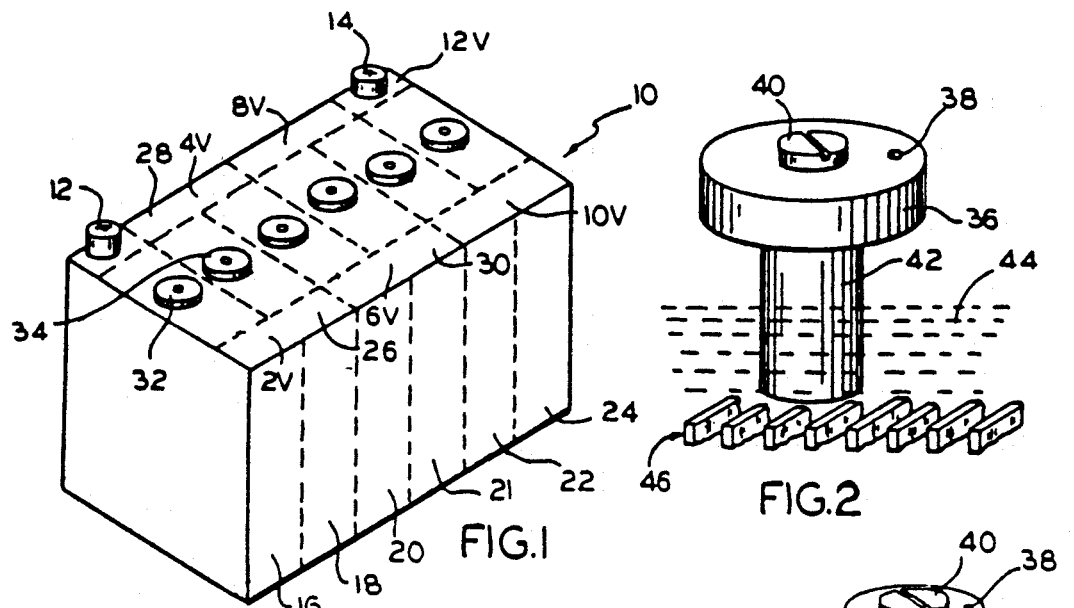
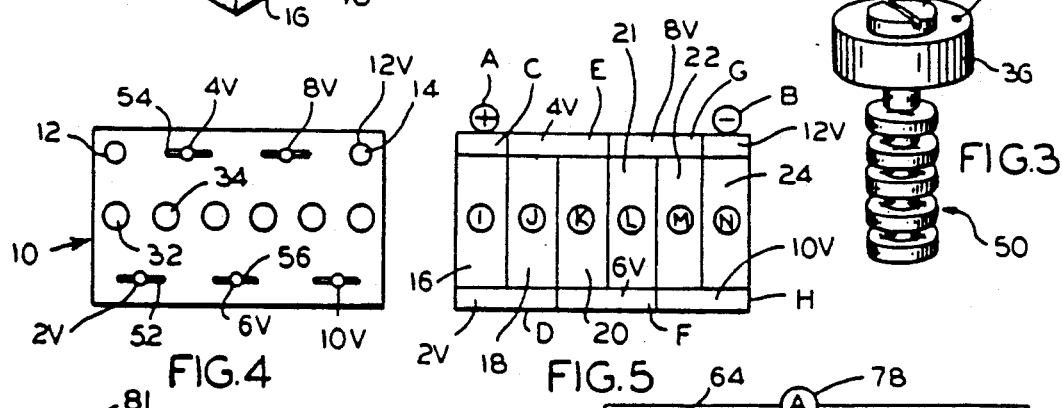
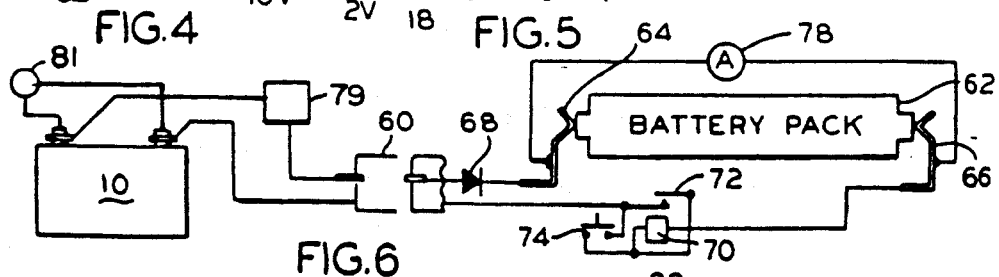
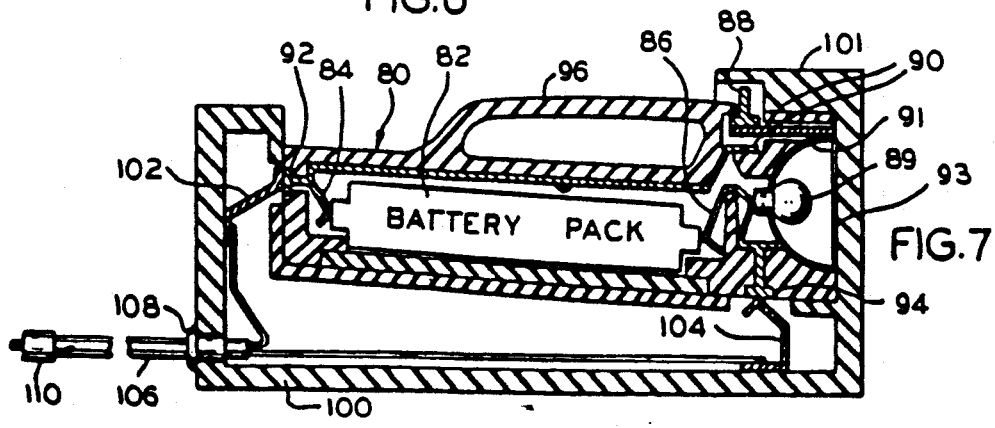

BATTERY CHARGERS FOR SECONDARY CELLS OF BATTERIES, WHICH CONTROL THE THERMO RESPONSE OF THE CHARGE ACCEPTOR

THIS IS A CONTINUATION-IN-PART OF SER. NO. 07/499,192, FILED Mar. 23, 1990, NOW ABANDONED, WHICH WAS IN TURN A CONTINUATION OF SER. NO. 07/161,317, FILED FEB. 23, 1988, NOW ABANDONED, WHICH WAS, IN TURN A CONTINUATION-IN-PART OF U.S. SER. NO. 07/008,184 FILED JAN. 28, 1987, NOW ABANDONED, WHICH WAS A CONTINUATION-IN-PART OF SER. NO. 06/773,850 FILED SEP. 9, 1985, NOW U.S. PAT. NO. 4,670,700, WHICH WAS, IN TURN A CONTINUATION-IN-PART OF SER. NO. 06/701,101, FILED FEB. 13, 1985, NOW ABANDONED.

This invention relates to battery chargers and, more particularly—but not necessarily exclusively—to chargers for secondary cells, especially high quality secondary cells, such as nickel-cadmium or nickel-iron and lead acid batteries ("charge acceptors").

The prior art battery chargers have not been designed with any thought as to the internal actions which occur within the battery. When a current limiting resistor is utilized in the charging circuit, no thought is given to AC ripple and capacitance within the charge acceptor.

If this resistor is merely sized to suppress (depress) current, this suppressed current allows the applied voltage to immediately approach virtually the cell's critical point of water dissociation and to set up a condition which is called "over-ionization". This over ionization causes gas bubbles to form on the cells electrodes. These bubbles are soon released into the electrolyte, which causes an additional overvoltaging. Then, because the bubbles are reduced from a gas back to liquid, hydroxyl (which can be any ratio of hydrogen and oxygen) releases heat because of phase change reactions. This hydrogen reduction is the cause of endothermic absorption of associated heats and that the oxygen is the cause of premature exothermic heat. If more hydrogen ions are reduced than oxygen ions the cell will cool. If more oxygen ions are reduced than hydrogen ions, the cell heats, all of this temperature change occurs before a full charge has been achieved.

When larger charge rates are used because larger charging voltages are used, the process is accelerated. When the resistor or resistance is sized to suppress or depress the impressed voltage, the ideal decomposition of water occurs, which produces and reduces more hydrogen than oxygen and this in turn allows an endothermic condition to exceed the exothermic reactions. The counterelectromotive force of the voltage impressed across the charge acceptor is reduced by the manipulation of ripple and resistance impedance. Thus, advantage is taken of the electrochemical thermodynamic reactions in order to control or maintain the thermo response of the cell's accepting of a charge so as to be virtually isothermic or endothermic.

Heretofore, when the battery is charged, water tends to become a free component, begins to gas, and heat is formed. As this occurs, the DC current begins to have a ripple caused by reflected voltage, due to ever changing transient voltage within the charge acceptor, which is an AC component. This AC component feeds on itself and increases the ripple caused effect. According to my invention, a designer of a charger would place an ammeter in series with the battery and a volt meter across the battery to read the AC component that is being generated by the charging current passing through the battery. Ideally, the charger would be designed so that both the ammeter and the volt meter record a zero component. Stated otherwise, a pure DC charging current would pass through the battery.

Of course, the world is not perfect and the hoped for ideal of a pure DC charging current (zero AC component) would probably be unattainable, at least in a commercially practical charger. The exact amount of allowable tolerance will vary with the cells being charged and the conditions under which they are being charged. For most batteries, there is an effectively "pure" DC charging current if it has a maximum AC component which is no more that 5% of the total charging current or voltage.

A test to determine whether the AC component is sufficiently small would be to determine whether the battery is heating. All known chargers, prior to my invention, cause the battery to heat during charging. With my invention, as it is charged, the battery heat remains virtually isothermic or endothermic.

Still another way of expressing the invention is that the input "resistance" is greater than the acceptor (battery) "resistance" during it acceptance of the charge. Quote marks are placed around the word "resistance" since both the DC and the ripple caused AC components of the charging current must be considered. Therefore, in so far as the "resistance" is applicable to any ripple caused AC, "impedance" might be a better word.

As used herein, the term "small battery" means one which may be directly charged by the voltage of a large battery (or an equivalent pure DC voltage source). A "small battery" requires much less than the amount of energy stored in the large battery (or the equivalent) in order to reach a full charge. A nickel-cadmium battery is one of many examples of both a small battery and a secondary battery or cell.

Also, in the traditional charger "brute force" is used to overcome the effects of electrochemical polarization. The electro-chemical polarization, which is caused by a disassociation of the electrolytic fluid during charging, produces high counterelectromotive forces within the cell being charged which impede the charge current. A greater charge voltage then otherwise would be necessary must, therefore, be used to charge the cell in order to overcome the counterelectromotive force. Thus, another test for designing a battery charger according to the invention is to eliminate the counterelectromotive forces caused by reflected voltage.

A "resistor/impedance" is any heat, voltage or current dependant means for adjusting the impedance of the charging source relative to the impedance of the charge acceptor.

In general, known battery chargers are rectifiers connected to AC power. These chargers may charge the secondary cells with a constant charging current, a quasi-constant charging current, a trickle charging current, or a step charging current which reduces through successive steps as a full charge approaches. In the traditional charger, brute force is used to drive electrons into a low charged or dead battery under some kind of a preconceived schedule, like so many rifle bullets being fired at a target, without consideration of whether the battery can accept the electrons or of variations caused by random events, differences between batteries, or the like. Therefore, care must be taken so that the charger will have a carefully controlled current, well regulated voltages, and the like. As a result, the prior art required most of the secondary cells to be charged for extended periods of time, such as 15-20 hours, with many safety precautions, still leaving many undesirable effects.

It is thought that many of the limitations which have caused battery chargers to require precautions results from the use of AC to power the charger and of the brute force approach of trying to make the charged battery conform with a preconceived norm rather than the secondary cell needs. Regardless of the procedures used to rectify and smooth the voltages, there is almost certainly a residual ripple which tends to cycle the battery being charged. As this happens, the internal voltage and resistance of the battery being charged begins to generate heat and, if no care is taken, the battery may be damaged or destroyed. According to the invention, the ripple and reflected voltage is held down to negligible levels. In any event, the invention provides means for causing any AC current ripple component in a charging means to lead any AC ripple voltage component in the acceptor cell.

It is also thought that merely driving a charging current into a battery without any relationship as to how rapidly the individual battery can absorb the charge, leads to the heating of the battery. These problems of gassing, heating and impeding the charging current are substantially reduced or eliminated if the impedance/resistance and the charging voltage of the charging source is larger than that of the battery receiving charge. In addition, heat associated with over charge is eliminated or controlled if the proper end of charge voltage is selected.

An impedance/resistance may be used in the charging source or its circuit which may be linear or non-linear and which is larger than the impedance/resistance of the cell or battery accepting recharge. With this impedance/resistance relationship, the internal voltage of the cell or battery accepting a recharge does not rise appreciably to meet the charging voltage and impede the charge current. As a result, there is little or no generation of heat within the cell or battery accepting recharge, at least until a substantially 100% recharge has been attained. Thus, according to the invention, the battery being recharged can be recharged at extremely high current rates with little or no generation of internal heat. Therefore, any normal secondary cell or battery can be recharged as quickly as the charging source and its circuit can deliver the required current.

The object of all battery charging systems is to charge batteries as rapidly as possible without overcharging them. The conventional wisdom is that fast charging of secondary cells, such as, for example, NiCd cells, with high charge currents leads to heating, reduced charge transfer, and premature cell failure. In addressing these problems, the Friedman patent (U.S. Pat. No. 3,825,740), the Mabuchi patent (U.S. Pat. No. 4,311,952) and the invention are somewhat similar in general, but they are based on very different principles and have very different operating characteristics. All of these designs are based on using lead-acid (motor vehicle) batteries (or an equivalent pure DC source) to charge a series of rechargeable nickel-cadmium cells.

The simplest approach is to directly connect a stack of nickel-cadmium cells to the lead-acid battery, connecting (+) to (+) and (−) to (−). This simplistic approach does not work in most cases because the voltage across the lead-acid battery and the nickel-cadmium stack do not necessarily match each other. The Friedman solution to the matching problems is to add a resistance "R" in series with the lead-acid battery; however, he does not make it clear how to choose the value of "R". When the nickel-cadmium batteries are being charged with current "I", there is a voltage drop across the resistor equal to IR, so that the net voltage (Vc) across the lead-acid battery (VB) and the resistor (IR) is $Vc = VB - IR$.

Unfortunately, both the current I and the voltage drop IR change as the nickel-cadmium batteries are being charged. When the nickel-cadmium batteries are fully charged, it is not desirable to continue charging them. Ideally, that is, the current I becomes zero, but then the circuit works only if Vc is chosen to be equal to VB. The Friedman patent does not indicate that this is the preferred choice. Moreover, since such a choice means that the charging voltage is below the final charged voltage (i.e. Vc is less than VB) during the entire time of charging, such a choice is unlikely in the Friedman patent. If the voltage of the battery (VB) is greater than the voltage across the battery and the resistor (Vc), a premature overpotentialling occurs and there will be a current I after the battery is fully charged and damage will be done to the nickel-cadmium cells which are being charged.

The Mabuchi patent proposes to match the voltages by using "a constant voltage battery charging system" in which the voltages are matched by the addition of diodes (referred to in Mabuchi as "non-linear resistors"). The voltage drop across the lead-acid cell in series with the diodes is calculated as $Vc = VB - n \times 0.6V$ where n is chosen to be equal to three (for 3 diodes) in the patent and VB is chosen to be equal to 12V. Mabuchi also indicates that the voltage drop across six nickel-cadmium cells is $6 \times 1.7V = 10.2V$. This value appears to be extremely high for nickel-cadmium cells which are normally close to 1.4V. The patent goes on to suggest that series-parallel combinations of nickel-cadmium cells can also be charged using the same technique.

However, FIG. 2c of the Mabuchi patent indicates that, when charging over long periods of time, the current does not go to zero and that the nickel-cell temperature begins to increase before full charge has occurred and limits the charge transfer. This is undesirable for the cells which are then being charged. The intent of Mabuchi may be to choose a net charging voltage that is somewhat higher than the desired fully charged value and is exothermic before fully charged.

A major problem with the Mabuchi design is that the circuit is not a constant voltage circuit as claimed. The description does not include the internal resistance Ri of the lead-acid battery which drops the voltage VB substantially when the charging battery is providing a high charging current. The charging voltage across the terminals of the lead-acid cell is given by $Vc = VB - IRi$. Therefore, the charging voltage changes and is not constant as "I" changes. Moreover, the use of a higher resistance in the power source or circuit causes endothermic heat which is otherwise built up within the nickel-cadmium cell during recharge, to be released at this point of higher resistance.

When the series-parallel form of charging shown in FIG. 3 of the Mabuchi patent is employed, the situation is more complicated. First, if each stack of nickel-cadmium cells has the same voltage, before being connected together, less current is supplied to each of the stacks since the total current is the same. If each stack has a different voltage, there is a significant imbalance between the charging current in the parallel paths. If there is a large difference in voltage, it is possible for current to flow from one set of nickel-cadmium cells to the other set of such cells. If so one set of nickel-cadmium cells is being charged by a discharging of the other set of nickel-cadmium cells. Whenever there is a voltage imbalance between the two stacks of nickel-cadmium cells, there is an accompanying dissipation of heat in the internal resistance of the nickel-cadmium cells, $R_{inc}$ and a corresponding reduction in charging efficiency.

According to the invention, it is possible to achieve fast charging (often within a few minutes) of NiCd cells with extremely high charge transfer efficiency (approaching 100%). This is possible because the internal resistance Ri of the lead-acid cells or optional equivalent DC power source which are used is much greater than the internal resistance of the nickel-cadmium cells which are being charged. The essential principle is to charge the Ni-Cd cells using a voltage source having an output impedance which is much greater than the impedance of the Ni-Cd cells. This condition is easy to achieve because the internal impedance (Rc) of Ni-Cd cells is very small (about 0.03 ohm) when the cells are not under charging conditions but increases greatly when under charge. The charging source voltage and the input impedance determines the maximum current supplied during the charging cycle, and by using small output impedances on the order of one ohm or more, depending upon the source voltage very high charging currents (and short charging times) can be achieved. The voltage matching is achieved by choosing the charging voltage which appears at the end of charge (with no current being drawn) to be equal to the final fully charged voltage which appears across the stack of nickel-cadmium cells. For example, the charging voltage required for nine nickel-cadmium cells with fully charged voltages of 1.40V is $9 \times 1.40V = 12.60V$. This is close to the voltage of a 6 cell lead acid battery when fully charged.

Also, a power supply circuit with a time varying output impedance value is controlled and maintained so as to be at all times larger then the input resistance of its charge acceptors with a time varying input impedance value due to changing transients. The power supply circuit may be a generator, alternator, or other AC or DC power source. The output/input relationship takes advantage of the resulting electrochemical reactions within the charge acceptor to provide cell cooling at virtually any rate of charge prior to and continuing to full charge.

When a full charge detector is required, it may detect values of voltage, current, temperatures, pressure or impedance. This allows the charging process to proceed at virtually any cell or battery temperature when the acceptor cells are charged individually, in series, parallel, or series parallel, and allows a broad range of full charge voltage and current and impedance values to be utilized without causing any of the known ill effects caused by the time varying random effects which has heretofore occurred in a charge acceptor prior to and during its charge cycle.

The charging system of the invention which utilizes a higher voltage and resistance/impedance can utilize several methods to recharge a secondary battery. For example, one method is to apply a charge voltage which is less than the full charge voltage VC of the secondary cell. Another method entails using a charge voltage which is greater than the full charge voltage of the secondary cell.

Another feature of the invention places a number of diodes in series with the small battery to add to the resistance of the large battery to more precisely match the end of charge voltage potential of the lead acid battery to the charged potential requirements of the small battery. A set of contacts may short circuit at least some of these diodes in order to accommodate the drop in potential which occurs when an alternator which was previously running is stopped. The short circuit may be removed when the alternator is operating or when the small battery reaches the desired level of charge by use of any current or voltage operated device which may either open the charging circuit or reduce the source voltage to a maintenance voltage in order to maintain the desired level of charge.

With these explanations in mind, the principles of the invention may be better understood from a few practical, working examples. In greater detail, a preferred embodiment of the invention is shown in the attached drawings, in which:

FIG. 1 is a perspective view of a lead-acid battery, such as an automobile battery, with its cells indicated by dashed lines;

FIG. 2 is a schematic showing of one way of making a voltage tap to provide a specific one of many potential points which are available from this battery which allow the choice of voltage for an equalizing charge or quicker;

FIG. 3 is a perspective view of an alternative electrode for use in place of the electrode of FIG. 2;

FIG. 4 is a plan view showing the top of the battery of FIG. 1 and illustrating another way of obtaining any of a plurality of different potential points of voltage and impedance;

FIG. 5 graphically shows the various places where connections may be made to the battery in order to establish different potential points;

FIG. 6 illustrates one exemplary electrical circuit for incorporating the invention in an automobile; and FIG. 7 is a cross sectional view of an exemplary small appliance incorporating the invention.

Other examples of charging circuits are shown in my patent U.S. Pat. No. 4,670,700.

By way of example, FIG. 1 shows a twelve volt automobile storage battery 10. The conventional positive and negative terminals 12, 14 may appear at any of several different points on the battery depending upon the design of the battery. The battery has six cells 16–24, each producing about two volts so that there are approximately twelve volts across the terminals 12, 14.

Inside each cell there are a plurality of interleaved plates formed into sets by one set being joined at one end by a bus bar and the other set being joined at the opposite end by another bus bar. As shown at 26, 28, by way of example, each plate in one of the two sets of plates is connected to bus bar 26 and each plate in the other of the two sets is connected to the bus bar 28. Each of the bus bars 26, 28 extend over the ends of two adjacent cells in order to connect various cells in series. Therefore, each bus bar represents a point where a voltage tap may be made in order to pick off a specific voltage. For example, there are two volts (less any internal impedance drop) across terminals 26, 28 and four volts (less any internal drop) across terminals 26, 30. Likewise, each of the cells 16-24 has a fill cap, as at 32, to enable water to be poured into the cell and gas to escape therefrom. Thus, there is a two-volt potential between voltages measured through the openings covered by any two adjacent fill caps, such as caps 32, 34, for example.

FIG. 2 shows how to make an electrical connection to the electrolyte in a single cell. A cap 36 is the same as the conventional cap 32, for example, except that a vent 38 is formed on a side to allow gas to escape from the cell. The center hole formally used as a vent receives a screw 40, which may be made of any electrically conductive material, such as brass, for example. This screw 40 attaches an electrode 42 to the bottom of the cap 36.

When cap 36 is in place and properly seated on the battery, the electrode 42 depends far enough into electrolyte 44 to make a good electrical contact therewith. However, it does not depend far enough to make any electrical contact with the tops of the plates 46. Accordingly, any connection made to the screw 40 is at the potential of the electrolyte. This electrode 42 does not deteriorate from either the effects of the sulfuric acid, polarization or from electrolysis when used as the anode.

An alternative electrode 50 (FIG. 3) has a plurality of spaced apart fins to increase the surface area of the electrode which is in contact with the electrolyte 44.

FIG. 4 illustrates how a plurality of voltage taps or potential points may be provided to give a spread of potential differences, which may be selected to match the voltage and impedance needs of a particular battery or group of batteries. In greater detail, FIG. 4 shows the top of the battery 10, with the same terminals 12, 14 when exposed terminals or other connections are not readily available. A hole is formed in the top of the battery case over each of the internal bus bars (such as 26-30, etc. in FIG. 1). An upstanding bolt passes through this hole and turns into or otherwise makes good electrical contact with the underlying bus bar. A wing nut fits over that bolt to enable a wire to be easily connected thereto. For example, if a wire is placed under wing nut 52, it is in direct electrical contact with the bus bar 26 (FIG. 1) and there is a two volt potential, with respect to terminal 12. Likewise, wing nuts 54, 56 are in direct electrical contact with the bus bars 28, 30, respectively and there are four volt and six volt potentials with respect to terminal 12.

FIG. 5 graphically shows where and how connections may be made. A connection across the terminals A, B experience the full 12-volts available from the battery. Terminals C-H are connected into selected bus bars. Therefore, a connection between, say terminal C and terminal F has a potential equal to the sum of the potential of three cells 16-20. The electrodes (FIGS. 2 or 3) may be in any or all of the fill cap locations I-N.

The criteria for the selection of the correct terminals for making connections to charge small batteries should be apparent. In greater detail, each 1.2V nickel-cadmium battery cell requires a voltage of 1.4V or more for it to be charged by the inventive method. The following voltage chart indicates the voltage requirements needed to recharge different numbers of nickel-cadmium secondary batteries or cells. These voltages are approximate, due to the different inherent characteristics of the cells themselves and due to design and manufacturing differences. Also, the charging and discharging of all cells and batteries is effected by the ambient temperature and the latent heat of the power supply battery, and by the battery accepting recharge from an ac-dc source.

| NUMBER OF NI—CD CELLS | MINIMUM VOLTAGE REQUIRED | NUMBER OF NI—CD CELLS | MINIMUM VOLTAGE REQUIRES |
| --- | --- | --- | --- |
| 1 | 1.40 V | 6 | 8.40 V |
| 2 | 2.80 V | 7 | 9.80 V |
| 3 | 4.20 V | 8 | 11.20 V |
| 4 | 5.60 V | 9 | 12.60 V |
| 5 | 7.00 V | 10 | 14.00 V |

The following voltage chart indicates the potentials which are available from a conventional 12V lead-acid automobile battery, using the inventive system, when the battery is charged (i.e. the batteries open circuit voltage between terminals A and B (FIG. 5) stands at 12.92V.

| Positive Terminal A to: | Terminal | Negative Voltage | Terminal B to: | Terminal | Positive Voltage |
| --- | --- | --- | --- | --- | --- |
| | I | 1.84 V | N | 0.28 V | |
| | J | 4.00 V | M | 2.44 V | |
| | K | 6.16 V | L | 4.61 V | |
| | L | 8.31 V | K | 6.75 V | |
| | M | 10.47 V | J | 8.95 V | |
| | N | 12.64 V | I | 11.09 V | |
| Positive Terminal I to: | Terminal | Negative Voltage | Terminal J to: | Terminal | Positive Voltage |
| | J | 2.11 V | K | 2.07 V | |
| | K | 4.25 V | L | 4.24 V | |
| | L | 6.41 V | M | 6.43 V | |
| | M | 8.52 V | N | 8.59 V | |
| | N | 10.74 V | | | |
| Positive Terminal K to: | Terminal | Negative Voltage | Terminal L to: | Terminal | Positive Voltage |
| | L | 2.10 V | M | 2.13 V | |
| | M | 4.27 V | N | 2.17 V | |
| | N | 6.44 V | | | |

The connections to the battery can be made through the cigarette lighter or a similar socket 60, when the selected voltage connection is to be made between normal battery terminals A and B are the positive and negative posts of battery 10 (FIG. 6). If a battery pack 62 has eight or nine nickel-cadmium batteries which are placed in series, they can be connected through the lighter to be recharged to full capacity, by using the inventive voltage equalization method.

The principles of the invention should now be clear. When a charging current I is present, there is a voltage drop across the terminals of the lead-acid cell. The invention is based on a property of the lead-acid cell wherein the internal resistance $R_i$ of the nickel-cadmium cell is much less than the internal resistance of lead-acid cells. Regardless of whether the battery or an AC source is used, or whether direct or indirect, is when the charger connected to the stack of nickel-cadmium cells, the voltage across the terminals of the lead-acid cell is determined by the nickel-cadmium cells and not by the lead-acid battery.

The voltage drop takes place in the internal resistance Ri within the lead-acid cell, because the internal resistance $R_i$ of the lead-acid battery is much larger than the net internal resistance of the nickel-cadmium stack of cells. Note it is well known that nickel-cadmium cells have very low internal resistance but is larger than an equivalent lead acid cell, due to a larger resistance of its electrolyte.

Thus, the inventive circuit can be used to charge any cell which has the property that its internal resistance is much lower than the internal resistance of the charging source or its circuit while under charge. When using the inventive circuit, it is often possible to achieve nearly 100% charging efficiency since substantially all of the charge transferred to the NiCd cells being charged can be recovered during the following discharge.

The rules are that when no controls are utilized (1) the total impedance of the secondary circuit including the nickel-cadmium cells must be less than the total impedance of the primary (charging) source or its circuit across terminals and (2) the fully charged voltage of the secondary circuit must be no greater than the maximum potential voltage across terminals of the primary circuit including a battery (or the equivalent) and resistance IR.

The large battery contains a relatively high level of charge compared to the battery being recharged. The small and a& least partially exhausted battery contains a relatively low level of charge and is connected across the selected terminals of the large battery. The relative levels of voltage in the two batteries equalize so that both come to have the same relative level of voltage. Thus, if the small battery is exhausted, it receives energy from the large battery until both batteries arrive at the same voltage level. From the large battery, the small battery absorbs the energy at its natural charging rate of charge acceptance. There is no independently powered charger trying to overpower the small battery and to drive a charge into it, regardless of whether the charging rate is more or less than the battery can accept.

It has been found that, with the automobile alternator charger inactive, nine small NiCd battery cells can be recharged in approximately six hours, or less, when connected in series to the large battery terminals A and B, if the voltage of the automobile battery stands at 12.6 volts, or more. These same nine cells can be recharged at a much faster rate when the alternator or charger is active. In a system actually built and tested, the recharging time was approximately one and one-half hours with the alternator active.

It has also been found that no current limiting or charge terminating controls are needed when recharging 3, 6 or 9 NiCd cells from either 2, 4 or 6 cells of a fully charged 6 cell lead acid battery not being charged. There does not appear to be a need for a diode to stop any current backflow when utilized as stated above. However, when the 6 cell lead acid battery is employed in an automotive vehicle it is thought that it might be prudent to have a diode 68 in the circuit since the voltage in an automobile system may fluctuate responsive to the use of brake lights, radio, air conditioning, heating systems, head lights, etc. Also, some batteries may charge partially if the alternator is not operating and fully charge when the alternator is in operation. This unit has to be disconnected from the charging source before the engine is turned off. Therefore, an example of when a diode should be provided to stop any back flow of current is when the charger is not controlled by the ignition switch.

When charging a secondary cell or battery according yo the invention, the attainment of full charge voltage within the battery can be determined by incorporating a well known device such as volt or ammeter within the charging circuit. With the foregoing information, it is possible for almost anyone to recharge any suitable number, type and size of rechargeable batteries, especially nickel-cadmium lead acid and nickel-iron types of batteries.

FIG. 6 shows a battery charging system comprising a DC power source charging means 10, 81. The battery pack 82 includes at least one secondary charge acceptor (A Ni-Cad battery) utilizing an aqueous electrolyte. The applied power source voltage is equal to or greater than the full charge level of the acceptor cells in battery pack 62. An impedance/resistance means (here represented by diode 68) couples the charging means 81, 10 to the secondary charge acceptor cell. The impedance/resistance value is selected to reduce any AC component out of the secondary cell. This virtual elimination of AC ripple and voltage reflection within the secondary cell reduces the counterelectromotive force responsive to a voltage applied across said secondary charge acceptor in order to produce a cooling of the acceptor cell (non-heating).

The impedance/resistance 68 value is selected to set either or both the capacitive reactance of the acceptor cell or the inductive reactance of the charging means at levels which reduces the counterelectromotive force of the acceptor cell throughout the full charge cycle. The value holds any AC ripple caused current component to lead any AC ripple caused voltage component within the acceptor cell, in order to produce the cooling effect.

There is no need to provide automatic controls for terminating the charging since the charge on the charging and charged batteries equalizes and then there is no potential difference to continue the charging process. On the other hand, it is always good to disconnect any electrical circuit when it is not in use. Therefore, FIG. 6 has been drawn with a current sensing relay 70 or any similar device which accomplishes the same results which could have a fixed or adjustable value in regard to the point of operation, such as the use of a proximity operates switch having make contacts 72 which are shunted by a non-locking push-to-start button 74. After the push-to start button is closed, relay 70 operates and holds itself via its own contacts 72. As long as a substantial current flows, relay 70 continues to hold itself operated. When the voltages equalize as the small batteries reach a full charge, current drops and relay 70 releases its contacts 72 to disconnect the charging circuit. This current sensing relay opens the charging circuit responsive to a drop in amperage in order to terminate charging at any desired level of charge. An operation or release of the relay may be used to reduce the charging voltage to a maintenance voltage status where virtually no current flows to cause overcharge.

In an optional usage but not limited to when larger charging voltages are used can utilize, an ammeter 78 may be used to determine the amount of current in the battery pack 62 and, therefore, the state of the charge of the cells in battery pack 62. Alternatively, a voltage indicator of any type may also be utilized to determine the state of charge. The higher resistance of the source or its circuit prevents the internal voltage of the battery accepting recharge especially under high charge current conditions from rising appreciably to meet the charging voltage. This high current could possibly be caused by the higher resistance of the source or its circuit producing an electro-chemical depolarization effect within the cell or battery accepting recharge.

In another optional usage, a voltage regulator 79 may be placed in the charging circuit to open the circuit after equilibrium, or desired level of charge has been attained.

In yet another optional usage, an AC charger may be used to maintain the voltage of battery 10. This may be a trickle charger 81 (FIG. 6) or may be a conventional charger utilizing the high resistance factor. Using the foregoing principles, the battery 10 may simply float at the charger output level in order to eliminate ripple in the cell being charged. If a power source such as an AC charger is used, then it is possible and advisable to employ a thermostat to monitor the temperature of the cells in order to terminate current flow if the secondary cells should incur some heating due to a fault in the charger or any of the cells being recharged.

The existing literature states that the charging current applied to the battery pack 62 should be limited to 10% of the charged cell capacity, or about 180 MA for a size C cell rated at 1800 MA or 400 MA for a battery pack made up of size D cells rated at 4000 MA cell capacity. However, I have found that, when the charging voltage is in the range of 1.40–1.45V per cell, the initial charging current may be as much as forty times or greater than this recommended limit.

The invention may use one or more diodes, to limit over potentialling, the diodes being connected in series for matching the potential of the large battery to the specific voltage impedance needs of the small batteries pack. In one embodiment, the diode actually used had 0.9 volt drop on the forward voltage, although a variety of diodes with other forward voltage drops have been tested.

An engine/alternator or charger being used as either a trickle charger or conventional charger utilizes a higher resistance factor and provides the following benefit when the charging system is inactive. A stack of (say nine) nickel cadmium cells 62 draw very little current from the battery until current ceases at which point all cells in the battery pack rebalance their individual voltages among themselves to rebalance the stack which gives the system the added benefit of rebalancing among themselves with a minimum reduction of reserve capacity of the power supply battery. Since these cells are only partially charged, such as the smaller batteries used in today's automobiles, motorcycles, snowmobiles etc. which have low reserve capacities, then when the incremental voltage increase introduced by the active alternator, charger or trickle charger is offset by the voltage drop across any suitable number of diodes 68 coupled in series with the battery pack. This allows the nickel cadmium cells 62 to be charged to the designed desired voltage level of the system as a result of the current produced by the active alternator, charger or trickle charger utilizing the designed or inherent higher resistance of power source as compared to batteries accepting recharge. Also, by utilizing this system, battery accepting recharge has no ampere hour limitations as to its capacity.

The lead acid battery described may be replaced by a regulated power supply set at approximately 1.40 to 1.45 volts per nickel-cadmium cell and approximately 2.3 to 2.5 volts per lead acid cell or more if faster charges are desired. The regulated power supply must possess a discharge resistance or impedance that is larger than the resistance of the cell or battery accepting recharge.

The charging current is determined by $Ich = (Vs - Vc(t))/Rex = V(t)Rex$, where $V(t)$ is voltage across the cells being charged (which increases in time), $Vs$ is the power supply voltage, and resistance $Rex$ is the selected series resistance. High charging currents can be achieved simply by choosing small values of $Rex$ (while still maintaining resistance $Rex$ at a value which is much greater than the internal resistance of the NiCd cells).

If a non-linear resistance is added to the circuit, the voltage of the regulated power supply is raised proportionally to compensate for the voltage drop that the non-linear resistance produces at the end of charging. This non-linear voltage drop, which may be caused by the minute current flows being utilized, may vary over a wide range regardless of the type of non-linear resistance employed. For example, when using non-linear resistors, the voltage drop can vary from practically nothing to approximately 9/10 of a volt depending upon whether single diodes in series are used. This voltage drop is different when using silicone full wave bridge rectifiers in a straight through fashion, and is still different when the power supply is connected as a full wave bridge rectifier for rectifying alternating current to direct current.

It is of importance that this system operates and charges as rapidly as it does, without causing any internal endothermic heat, because the higher resistance is utilized in its power source or its circuit. The same operation of this system will charge lead-acid or any other type of secondary cell or battery. The resistance of a lead-acid battery used as the power source can be raised by merely reducing the strength of the electrolyte, as by cutting it with distilled water, for example. This system not only increases the charging speed and efficiency but, also alleviates or eliminates the following problems associated with the recharging of any secondary cell or battery:

1. By choosing the correct resistance of a power source or circuit, there is a substantial reduction of a build up of heat in a battery accepting a recharge at any part of the charge cycle until the full charge potential has been attained. By choosing the correct end of charge voltage, the generation of heat is eliminated in the battery accepting the recharge, which is caused from overcharge, or overpotentialling heat which may cause a pressure build up in a sealed cell or a venting in an open cell.
2. Extends the life of separators.
3. Extends the life of the grid system of the positive plates by eliminating an excessive or premature oxidation caused by overcharge current.
4. Reduces a shedding of active materials caused by overcharge current heat.
5. Eliminates overcharge voltage depression, often confused with memory and other reduced capacity problems.
6. Enables a recharging in series, series-parallel, and parallel without causing known problems.
7. Rebalances the voltage and capacity of each cell in the battery.
8. Enables the recharging of cells of different capacities or charge levels in series, series-parallel or parallel connections.
9. Eliminates venting of explosive and corrosive gases or liquids.
10. Eliminates reverse charging and cell reversal.
11. Provides capacity reconditioning--equalization of cells required because of cell fadinq.
12. Eliminates thermal runaway.
13. Provides for high speed recharging.
14. Reduces the evolution of oxygen at the cathode of the cell being charged.
15. Reduces the voltage-induced electrochemical polarization in the cell being charged.

Those who are skilled in the art will readily perceive how to modify the invention. Therefore, the appended claims are to be construed to cover all equivalent structures which fall within the true scope and spirit of the invention.

I claim:

1. A battery charging system comprising a power source charging means, at least one secondary charge acceptor cell utilizing an aqueous electrolyte, an effective applied power source voltage being at least substantially equal to the full charge level of said at least one secondary charge acceptor cell, an impedance/resistance means coupling said charging means to said at least one secondary charge acceptor cell, said impedance/resistance means having a value which reduces any AC component out of said at least one secondary charge cell to no more than 5% of the total voltage out of said at least one secondary charge acceptor cell to reduce a counterelectromotive force responsive to a voltage applied across said at least one secondary charge cell acceptor thereby producing a cooling of said at least one secondary acceptor cell and reducing its end of charge temperature, and means for causing any AC ripple current component in the charging means to lead any AC ripple voltage component within the at least one secondary charge acceptor cell.

2. The battery charger of claim 1 wherein said impedance/resistance has a value selected to set the capacitive reactance of the at least one secondary charge acceptor cell at a level which reduces the counterelectromotive force of the at least one secondary charge acceptor cell throughout the full charge cycle in order to produce said cooling.

3. The battery charger of claim 1 wherein said impedance/resistance has a value selected to set the inductive reactance of the at least one secondary charge acceptor cell at a level which reduces the counterelectromotive force of the at least one secondary charge acceptor cell throughout the full charge cycle in order to produce said cooling.

4. The battery charger of claim 1 wherein said impedance/resistance has value selected to set the capacitive reactance of the at least one secondary charge acceptor cell and the inductance reactance of the charging means at levels which reduce counterelectromotive force of the at least one secondary charge acceptor cell throughout the full charge cycle in order to produce said cooling.

5. The battery charger of claim 1 and means for adjusting the capacitive reactance of the at least one secondary charge acceptor cell and the inductance of the charging means to reduce the counterelectromotive force of the at least one secondary charger acceptor cell throughout the full charge cycle in order to produce said cooling.

6. The battery charger of claim 1 wherein said at least one secondary charge acceptor cell has a capacitive reactance, and means for cooperating with the capacitive reactance of the at least one secondary charge acceptor cell in order to change its effective capacitance and both the inductive and capacitive reactances of the charging means throughout the full charge cycle to reduce the counterelectromotive force responsive to the voltage applied across the charge acceptor cell.

7. The battery charger of claim 1 and means for holding the thermal response of the at least one secondary charge acceptor cell within the range of 120° F. and −10° F. throughout the charging cycle.

8. A battery charging system comprising a power source charging means, at least one secondary charge acceptor cell utilizing an aqueous electrolyte, an effective applied power source voltage being at least substantially equal to the full charge level of said at least one secondary charge acceptor cell, an impedance/resistance means coupling said charging means to said at least one secondary charge acceptor cell, said impedance/resistance means having a value which reduces any AC component out of said at least one secondary cell in order to reduce a counterelectromotive force response to a voltage applied across said at least one secondary charge acceptor cell thereby producing a cooling of said acceptor cell and reducing its end of charge temperature, said impedance/resistance being a value which substantially prevents said aqueous electrolyte from converting into its gaseous state to set the inductive reactance of the acceptor cell at a level which reduces the counterelectromotive force of the at least one secondary charge acceptor cell throughout the full charge cycle in order to produce said cooling, and means are provided for causing any AC ripple current component in the charging means to lead any AC ripple voltage component within the at least one secondary charge acceptor cell.

9. The battery charger of claim 8 and means for holding the thermal response of the at least one secondary charge acceptor cell within the range of 120° F. and −10° F. throughout the charging cycle.

10. A battery charging system comprising a power source charging means, at least one secondary charge acceptor cell utilizing an aqueous electrolyte, said charging means having an output voltage being at least substantially equal to the full charge level of said at least one secondary charge acceptor cell, an impedance/resistance means coupling said charging means to said at least one secondary charge acceptor cell, said impedance/resistance means having a value which reduces any AC component out of said at least one secondary acceptor cell in order to reduce a counterelectromotive force responsive to a voltage applied across said at least one secondary acceptor cell, thereby producing a cooling of said at least one secondary acceptor cell and reducing its end of charge temperature, said impedance/resistance being a value selected to set the inductive reactance of the at least one secondary acceptor cell at a level which reduces the counterelectromotive force of the at least one secondary acceptor cell throughout the full charge cycle in order to produce said cooling, means for holding any AC ripple current component to lead any AC ripple voltage component within the at least one secondary acceptor cell, and means for terminating said charge cycle of said at least one secondary acceptor cell while the temperature of said at least one secondary acceptor cell is no higher than it was when charging current was first applied to said at least one secondary charge acceptor cell.

11. A battery charging system comprising a power source charging means, at least one secondary charge acceptor cell utilizing an aqueous electrolyte, an effective applied power source voltage being at least substantially equal to the full charge level of said at least one secondary charge acceptor cell, an impedance/resistance means coupling said charging means to said at least one secondary charge acceptor cell, said impedance/resistance means having a value which reduces any AC component out of said at least one secondary charge acceptor cell in order to reduce a counterelectromotive force responsive to a voltage applied across said at least one secondary charge acceptor cell thereby producing a cooling of said at least one secondary charge acceptor cell and reducing its end of charge temperature, said impedance/resistance having a value which is selected to set the capacitive reactance of the at least one secondary charge acceptor cell and the inductive reactance of the charging means at levels which reduce a the counterelectromotive force of the at least one secondary charge acceptor cell throughout the full charge cycle in order to produce said cooling, and means for causing an AC ripple current component in an output of said charging means to lead any AC ripple voltage component within the at least one secondary acceptor charge cell.

12. The battery charger of claim 11 and means for holding the thermal response of the at least one secondary charge acceptor cell within the range of 120° F. and −10° F. throughout the charging cycle.

13. A battery charging system comprising a power source charging means, at least one secondary charge acceptor cell utilizing an aqueous electrolyte, the charging means having an effective voltage at least substantially equal to the full charge level of said at least one secondary acceptor cell, an impedance/resistance means coupling said charging means to said at least one secondary charge acceptor cell, said impedance/resistance means having a value which reduces any AC component out of said at least one secondary cell charge acceptor in order to reduce a counterelectromotive force responsive to a voltage applied across said at least one secondary charge acceptor cell thereby producing a cooling of said at least one secondary charge acceptor cell and reducing its end of charge temperature, said impedance/resistance being a value selected to set the capacitive reactance of the at least one secondary charge acceptor cell and the inductive reactance of the charging means at levels which reduce the counterelectromotive force of the at least one secondary charge acceptor cell throughout the full charge cycle in order to produce said cooling, and means for terminating said charge of said at least one secondary charge acceptor cell while the temperature of said at least one secondary charge acceptor cell is no higher than it was when charging began.

14. A method of charging a secondary charge acceptor cell having an aqueous electrolyte comprising the steps of:
coupling a power source having charging means to at least one secondary charge acceptor cell, said power source having an effective voltage which is substantially equal to the full charge level of said at least one secondary charge acceptor cell;
coupling an impedance/resistance between said charging means and said at least one secondary charge acceptor cell,
said impedance/resistance having a value which reduces any AC component out of said at least one secondary charge cell to no more than 5% of the total voltage out of said at least one secondary charge acceptor cell in order to reduce a counterelectromotive force responsive to a voltage applied across said at least one secondary charge cell acceptor thereby producing a cooling of said at least one secondary acceptor cell and reducing its end of charge temperature prior to substantial full charge, causing an AC ripple current component in an output of said charging means to lead any AC ripple voltage component within the secondary acceptor cell setting said impedance/resistance at a value which sets the capacitive reactance of the at least one secondary charge acceptor cell at a level which reduces the counterelectromotive force of the at least one secondary charge acceptor cell throughout the full charge cycle in order to produce said cooling.

15. A method of charging a secondary charge acceptor cell having an aqueous electrolyte, comprising the steps of:
coupling a power source having charging means to at least one secondary charge acceptor cell, said power source having an effective voltage which is substantially equal to the full charge level of said at least one secondary charge acceptor cell;
coupling an impedance/resistance between said charging means and said at least one secondary charge acceptor cell,
said impedance/resistance having a value which reduces any AC component out of said at least one secondary charge cell to no more than 5% of the total voltage out of said at least one secondary charge acceptor cell in order to reduce a counterelectromotive force responsive to a voltage applied across said at least one secondary charge cell acceptor thereby producing a cooling of said at least one secondary acceptor cell and reducing its end of charge temperature prior to substantial full charge, causing an AC ripple current component in an output of said charging means to lead any AC ripple voltage component within the secondary acceptor cell setting said impedance/resistance at a value which sets an inductive reactance of the at least one secondary charge acceptor cell at a level which reduces the counterelectromotive force of the at least one secondary charge acceptor cell throughout the full charge cycle to produce said cooling.

* * * * *